G. H. DEATON.
RECORD CALENDAR.
APPLICATION FILED MAY 28, 1920.

1,427,786.

Patented Sept. 5, 1922.

INVENTOR
George H. Deaton
By Cromwell, Greist & Warden
ATTORNEYS

Witness:

G. H. DEATON.
RECORD CALENDAR.
APPLICATION FILED MAY 28, 1920.
1,427,786.
Patented Sept. 5, 1922.
2 SHEETS—SHEET 2.
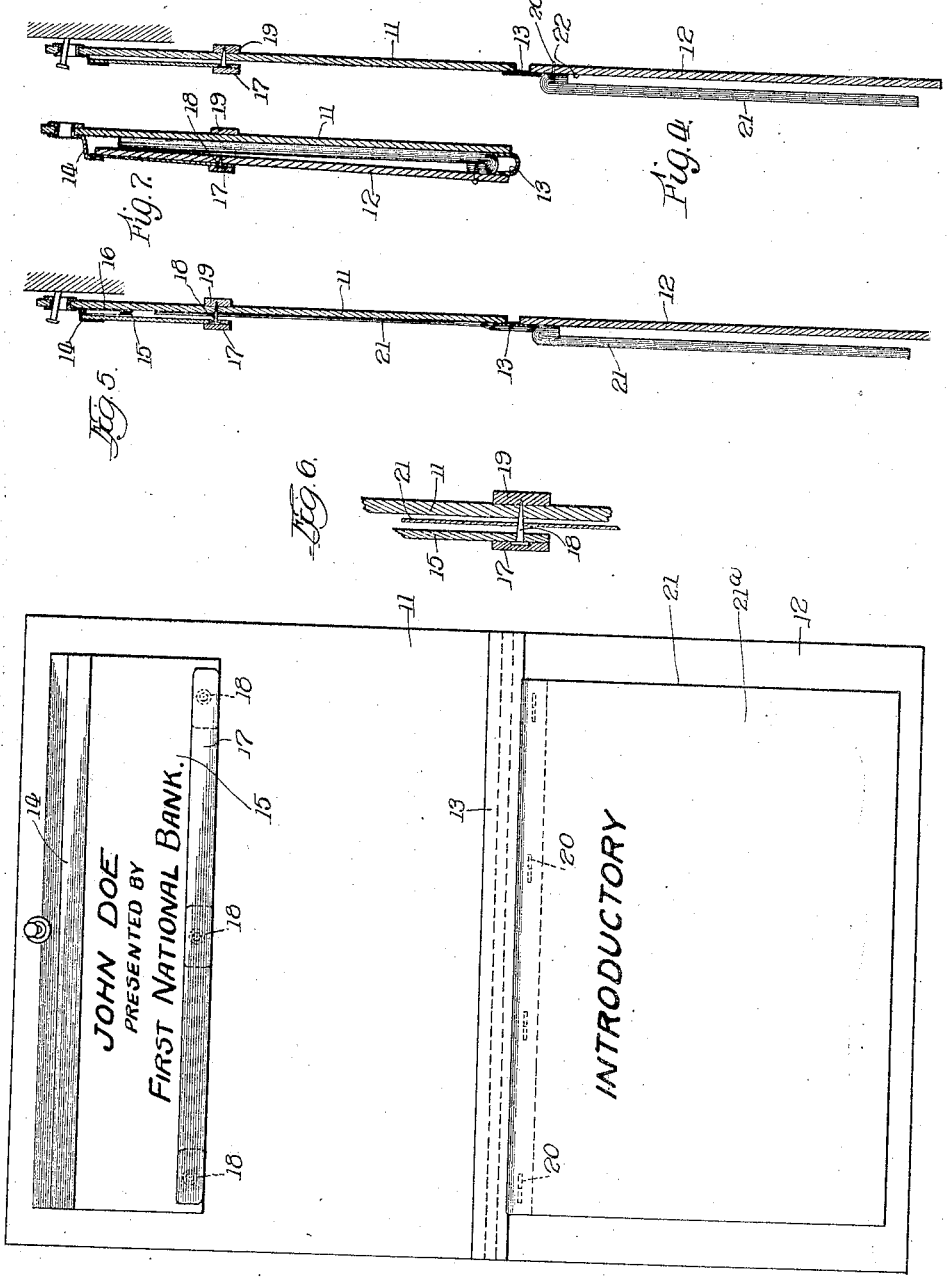
INVENTOR
George H. Deaton,
By Cromwell, Greist & Warden
ATTORNEYS Patented Sept. 5, 1922.

1,427,785

UNITED STATES PATENT OFFICE.

GEORGE H. DEATON, OF MAYWOOD, ILLINOIS.

RECORD CALENDAR.

Application Filed May 28, 1920. Serial No. 384,850.

*To all whom it may concern:*

Be it known that I, GEORGE H. DEATON, a citizen of the United States, residing at Maywood, in the county of Cook and State of Illinois, have invented certain new and useful Improvements in Record Calendars, of which the following is a specification.

This invention has for its general object the provision of a device for preserving in privacy daily entries for permanent record of current events in association with a current calendar, and in particular a device of that class typified by my former Patents No. 1,117,802 of November 17, 1914, and No. 1,235,016 of July 31, 1917, the record calendar intended for distribution by sale to the user or dissemination as advertising matter by local banks or commercial houses to the farmers and others throughout their territory.

Having regard to the field of use for which such devices are primarily intended, it is of importance that the record calendar shall provide for the display of matter advertising the donor, for forwarding by mail economically and safely, for easy suspension for display and use, for ready checking reference to a calendar for the current month and preferably to both the preceding and proximate months, for convenient periodical entering of private memoranda and the maintenance of the privacy of the same, and for the preservation of such entries against a time of future reference such as the making out of income tax reports, payment and collection of outstanding accounts, etc.

Having in mind the serving of these and other objects in an efficient and simple manner, the record calendar of this present invention comprises, preferably, a pad of assembled calendar and record sheets secured along their medial portions to a foldable backing or base sheet in such manner as to provide for turning in leaf form and assembled in such manner as to expose to view, normally, upon one page a calendar for the current month and upon the companion opposed page twin calendars for the past month and the month to follow and, when turned over, to disclose upon the two opposed pages spaces for general entries and income tax memoranda or such other records as it may be desired to preserve in privacy although, for some purposes the record pages may be omitted; also a depending flap or clip adapted to overlie a portion of the turned-up sheet to secure such sheet in place, the flap being held down upon the underlying sheets by gravity, a weight, or other suitable means. This flap provides, also a space upon which may appear the name of the owner of the calendar or the advertisement of the distributor, or both.

Other structural advantages and capacity for use will be made apparent as the invention is hereinafter more fully described in connection with the accompanying drawings wherein a preferred embodiment is shown by way of exemplification. It is to be understood, however, that the calendar is susceptible of structural modification within a wide range without departure from the spirit of the invention, wherefore the drawing and the language employed in describing the particular embodiment of the invention illustrated are not to be taken in an unnecessarily limiting sense. In the drawings—

Fig. 1 is a face view of the calendar with the parts in position for use during the month of January, 1918, for example;

Fig. 2 is a similar view of the calendar in readiness for the entry of memoranda during that month;

Fig. 3 is a similar view representing the calendar as received and suspended previous to use;

Fig. 4 is a vertical section through Fig. 3;

Fig. 5 is a vertical section through Fig. 1;

Fig. 6 is an enlarged fragmentary vertical section illustrating one method of holding the clip upon an up-turned leaf; and Fig. 7 is a vertical section through the calendar as folded for mailing.

Having reference to the drawings for a detailed description of the particular embodiment of the invention illustrated the calendar is shown as comprising a relatively stiff backing or base sheet 11 foldable forwardly in its medial portion 12 by means of a securing hinge strip 13 of fabric or other suitable material. Along the upper edge of the base sheet is secured at 14 a depending flap 15. The weight of the flap alone may suffice to hold it in a depending position or it may be secured to the base sheet by a spring hinge 16 and it may be advantageously weighted by means of a binding strip 17, while as an additional safeguard against displacement it may be provided with a tack 18 adapted to pierce the base sheet and enter a reinforcement strip 19 on the back thereof. Any one of these methods of holding down the flap 15 may be employed as may be found most suitable. This flap advantageously serves for the imprint thereon of the name of the person to whom the calendar is presented with the name of the donor and such advertising matter as may be desired to have appear thereon.

Immediately below the line of fold of the base sheet a pad of assembled record and calendar sheets 21 is secured at 20 by means of staples, a line of stitching, a suitable adhesive or in other aproved manner, preferably along an edge underlying the reversely folded sheets, so as to provide for turning in leaf form from the dependent position normally occupied by the same to a flat elevated position underlying the flap. The exposed front page $21^a$ of the pad may be used for the exhibition of artistic or advertising matter or for introductory reading matter containing directions for the use of the calendar.

For use, the first leaf of the pad 21 is turned upwardly beneath the flap 15 and held in that position as shown in Fig. 5 whereupon the calendar presents the appearance shown in Fig. 1, the lower page $21^b$ presenting to view a full size calendar for the current month, for instance January 1918, while the opposed page $21^c$, being the reverse of that previously exposed, displays half size twin calendars for the months of December 1917 and February 1918. The calendar thus exposed is of general usefulness for the current month and the preceding and following months without regard to any record feature.

If now the owner desires to make a memorandum entry at any time during the month of January he turns the current calendar page upwardly to the position shown in Fig. 2 without placing the same under the flap disclosing the memorandum pages $21^d$ and $21^e$, and writes thereon. In the preferred form shown general memoranda would be entered upon the upper exposed blank page $21^d$ and specific memoranda as to income tax, for instance, upon the lower page $21^e$. He then drops the upturned leaf to its original position, the memoranda thereon being concealed beneath the overlying current calendar page $21^b$. This is repeated from time to time during the month. At the end of the month the leaf bearing the calendar for the month of January is turned upwards and permanently secured beneath the flap and also the next leaf which contains the specific memoranda is likewise turned up and secured permanently beneath the flap leaving the calendar with the month of February exposed on the lower page and the months of January and March exposed on the upper page.

An item of considerable importance in connection with calendars of this type is the adaptability to transmission through the mails cheaply and safely. A stiff backing sheet is an advantage, but a stiff calendar cannot be sent through the mails without mutilation except by the employment of large envelopes and protective mailing boards. Without a stiff backing sheet the calendar when suspended on the wall is disturbed by drafts causing its mutilation and it requires a mailing tube or the like to prevent injury during transmission. The expense connected with the mailing of either type is a considerable item in the cost of distribution. According to my invention this difficulty is solved by the hinging of the card board base sheet in two parts so as to permit the same to be folded for transmission in an envelope of one half the size of the calendar, the two base positions serving to reinforce each other against breaking and also to protect the interposed record calendar sheets.

From Fig. 7 it will be seen that for mailing the lower portion of the base sheet is turned upwardly with the pad of record calender sheets, and the flap 15 is caused to embrace the lower end of the base sheet while the tack 18, as used, pierces the rear face of the base sheet to prevent disengagement. Thus is provided a compact substantial article which may be transmitted in a comparatively small envelope without supplemental protective means.

At the end of the year when the record calendar has served its purpose and all of the sheets comprising the pad 21 have been turned upwardly and secured beneath the flap 15, that portion of the backing sheet beneath the line of attachment of the pad to the backing sheet may be cut away at the point 22 or, without cutting away the back, the calendar may be again folded as it was received in the mail, leaving a permanent record of reduced size with no part of the record exposed to view, which can be laid away or suspended as before for reference when desired.

I claim:

1. A record calendar comprising a pad of assembled sheets suitably mounted, the alternate sets of opposed pages corresponding in character, the first set bearing a calendar for the current month and the next set having blanks spaces for record entries, whereby record pages in course of entry will be normally concealed from view by the overlying current calendar page.

2. A record calendar comprising a pad of assembled sheets suitably mounted for turning in leaf form, the alternate sets of opposed pages corresponding in character, the first set bearing a calendar for the current month and the next set of opposed pages having blank spaces for record entries, whereby record pages in course of entry will be normally concealed from view by the overlying calendar page and completed record pages will be concealed from view by the associated calendar page.

3. A record calendar comprising a pad of assembled sheets suitably mounted for turning in leaf form, the alternate sets of opposed pages corresponding in character, the first set bearing a calendar for the current month and twin calendars for each of the preceding and following months, and the next set of opposed pages having blank spaces for record entries, whereby record pages in course of entry will be normally concealed from view by one of the overlying calendar pages and completed record pages will be concealed from view by the associated calendar page.

4. A record calendar comprising a pad of assembled sheets suitably mounted for turning in leaf form, the alternate sets of opposed pages corresponding in character, the first set bearing one a calendar for the current month and the other twin calendars for each of the preceding and following months, and the next set of opposed pages having blank spaces one for general record entries and the other for entries of a specific character, whereby record pages in course of entry will be normally concealed from view by one of the overlying current calendar pages and completed record pages will be concealed from view by the associated calendar page.

5. A record calendar comprising a pad of assembled sheets suitably mounted for turning in leaf form, one leaf bearing upon its upper face a current calendar and upon its rear face blank spaces for record entries, and the next leaf having upon its front face blank spaces for record entries and upon its rear face a calendar for the same month as the preceding sheet and for the second month thereafter, whereby there will be normally exposed to view opposed pages bearing respectively a calendar for the current month and twin calendars for the preceding and following months, the current month page overlying records in course of entry and the twin calendar page overlying completed record pages.

6. A record calendar comprising a pad of assembled sheets suitably mounted for turning in leaf form, the alternate sets of opposed pages corresponding in character, the first set bearing a calendar for the current month and the next set of opposed pages having blank spaces for record entries, whereby record pages in course of entry will be normally concealed from view by the overlying calendar page and completed record pages will be concealed from view by the associated calendar page, and means for holding the associated calendar page down upon leaves bearing completed records whereby to maintain the privacy of the same.

7. A record calendar comprising a pad of assembled sheets suitably mounted for turning in leaf form, the alternate sets of opposed pages corresponding in character, the first set bearing one a calendar for the current month and the other twin calendars for each of the preceding and following months, and the next set of opposed pages having blank spaces one for general record entries and the other for entries of a specific character, whereby record pages in course of entry will be normally concealed from view by one of the overlying current calendar pages and completed record pages will be concealed from view by the associated calendar page, and a clip device for holding the twin calendar page down upon leaves bearing completed entries to maintain their privacy.

8. A record calendar comprising a stiff base sheet provided with means of suspension and foldable along a medial horizontal line, a pad of assembled sheets suitably mounted upon the base adjacent the line of fold for turning in leaf form, the alternate sets of opposed pages corresponding in character, the first set bearing a calendar for the current month and twin calendars for each of the preceding and following months, and the next set of opposed pages having blank spaces for record entries, and a flap to receive the upturned leaves, whereby record pages in course of entry will be normally concealed from view by the loosely overlying calendar page and completed record pages will be concealed from view by the associated calendar page and flap, the relation of the fold and flap to the base and calendar sheets being such as to enable the lower part of the base to be upturned with the calendar sheets and the flap to embrace the lower edge of the base sheet whereby to hold the two base portions together upon the interposed calendar sheets for protection in mailing.

9. A record calendar comprising a pad of assembled sheets suitably mounted for turning in leaf form, the alternate sets of opposed pages corresponding in character, the first set bearing one a calendar for the current month and the other twin calendars for each of the preceding and following months, and the next set of opposed pages having blank spaces one for general record entries and the other for entries of a specific character, whereby record pages in course of entry will be normally concealed from view by one of the overlying current calendar pages and completed record pages will be concealed from view by the associated calendar page, and a flap for holding the twin calendar page down upon leaves bearing completed entries to maintain their privacy, said flap provided with a tack for piercing the upturned leaves.

10. A record calendar comprising a stiff base sheet provided with means of suspension and foldable along a medial horizontal line, a pad of assembled sheets suitably mounted upon the base adjacent the line of fold for turning in leaf form, the alternate sets of opposed pages corresponding in character, the first set bearing a calendar for the current month and twin calendars for each of the preceding and following months, and the next set of opposed pages having blank spaces for record entries, and a clip device to receive the upturned leaves, whereby record pages in course of entry will be normally concealed from view by the loosely overlying calendar page and completed record pages will be concealed from view by the associated calendar page, the relation of the fold and clip device to the base and calendar sheets being such as to enable the lower part of the base to be upturned with the calendar sheets and the clip device to embrace the lower edge of the base sheet whereby to hold the two base portions together upon the interposed calendar sheets for protection in mailing, said clip device provided with a tack for piercing the back of the base sheet to prevent disengagement.

11. A record calendar comprising a pad of assembled sheets suitably mounted for turning in leaf form, the alternate sets of opposed pages corresponding in character, the first set bearing a calendar for the current month and for each of the preceding and following months, and the next set of opposed pages having blank spaces for record entries, whereby record pages in course of entry will be normally concealed from view by the loosely overlying calendar page and completed record pages will be concealed from view by the associated upturned calendar page, and a flap for holding the upturned calendar page upon completed entries, said flap adapted to bear the name of the owner and the advertisement of the donor.

12. A calendar comprising a pad of assembled sheets mounted for turning in leaf form, a set of opposed pages presenting to view when opened one a calendar for the current month, the other twin calendars for each of the preceding and following months, and a flap to hold the turned leaves in elevated position, without obscuring the matter on the leaf last turned.

13. A record calendar comprising a pad of assembled sheets suitably mounted for turning in leaf form, the alternate sets of opposed pages corresponding in character, the first set bearing the calendar for the current month and the next set of opposed pages having blank spaces for record entries, whereby record pages in course of entry will be normally concealed from view by the overlying calendar page and completed record pages will be concealed from view by the associated calendar page, and means for holding the associated calendar page down upon leaves bearing completed records without obscuring from view any substantial portion of the said associated calendar page.

14. A record calendar comprising a pad of assembled sheets suitably mounted for turning in leaf form, the alternate sets of opposed pages corresponding in character, the first set bearing one a calendar for the current month and the other twin calendars for each of the preceding and following months, and the next set of opposed pages having blank spaces for record entries, whereby record pages in course of entry will be normally concealed from view by one of the overlying current calendar pages and completed record pages will be concealed from view by the associated calendar page, and means for holding the twin calendar page down upon leaves bearing completed entries without obscuring from view any substantial portion of the said twin calendar page.

15. A record calendar comprising a stiff base sheet provided with means of suspension and foldable along a horizontal line, a pad of assembled sheets suitably mounted upon the base below the line of fold for turning in leaf form, the alternate sets of opposed pages corresponding in character, the first set bearing a calendar for the current month and twin calendars for each of the preceding and following months and the next set of opposed pages having blank spaces for record entries, and means to receive and retain the upturned leaves, whereby record pages in course of entry will be normally concealed from view by the loosely overlying calendar page and completed record pages will be concealed from view by the twin calendar page, the relation of the fold to the base and calendar sheets being such as to enable the lower part of the base to be upturned with the calendar sheets to bring the upper and lower parts of the calendar into parallelism for convenience in mailing.

In testimony whereof I have hereunto signed my name in the presence of two subscribing witnesses.

GEORGE H. DEATON.

Witnesses:
RAYMOND L. GREIST,
ROSE G. PERLMUTER.